United States Patent
Kurtz et al.

(10) Patent No.: US 8,800,376 B2
(45) Date of Patent: Aug. 12, 2014

(54) TORQUE INSENSITIVE HEADER ASSEMBLY

(75) Inventors: Anthony D. Kurtz, Saddle River, NJ (US); Adam Kane, Morristown, NJ (US); Boaz Kochman, New York, NY (US); Nora Kurtz, legal representative, Saddle River, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 275 days.

(21) Appl. No.: 13/256,874

(22) PCT Filed: May 4, 2010

(86) PCT No.: PCT/US2010/033601
§ 371 (c)(1),
(2), (4) Date: Sep. 15, 2011

(87) PCT Pub. No.: WO2010/129591
PCT Pub. Date: Nov. 11, 2010

(65) Prior Publication Data
US 2012/0060618 A1    Mar. 15, 2012

Related U.S. Application Data

(63) Continuation of application No. 12/387,548, filed on May 4, 2009, now Pat. No. 7,878,069.

(51) Int. Cl.
*G01L 9/04*    (2006.01)
*G01L 7/08*    (2006.01)
*H01G 7/00*    (2006.01)

(52) U.S. Cl.
USPC .............................. 73/720; 73/715; 361/283.4

(58) Field of Classification Search
None
See application file for complete search history.

(56) References Cited

U.S. PATENT DOCUMENTS

| | | | |
|---|---|---|---|
| 5,142,912 A * | 9/1992 | Frische | 73/702 |
| 5,756,899 A * | 5/1998 | Ugai et al. | 73/714 |
| 6,255,728 B1 * | 7/2001 | Nasiri et al. | 257/704 |
| 6,351,996 B1 * | 3/2002 | Nasiri et al. | 73/706 |
| 7,878,069 B2 * | 2/2011 | Kurtz et al. | 73/715 |
| 8,286,495 B2 * | 10/2012 | Kurtz et al. | 73/715 |
| 8,635,915 B2 * | 1/2014 | Kurtz et al. | 73/715 |

* cited by examiner

*Primary Examiner* — Lisa Caputo
*Assistant Examiner* — Jermaine Jenkins
(74) *Attorney, Agent, or Firm* — Troutman Sanders LLP; James E. Schutz

(57) ABSTRACT

There is disclosed a high pressure sensing header which is relatively insensitive to mounting torque. The header generally includes an outer torque isolating shell which has a "C" shaped cross section with the cylindrical shell surrounding an inner "H" section header. The inner "H" section header has a thick diaphragm and is at least partially surrounded by the torque isolating shell. In this manner, when the header is installed, the installation force is absorbed by the outer shell and there is relatively no installation force or torque exhibited by the inner "H" section which will respond only to stress due to pressure.

21 Claims, 7 Drawing Sheets

TORQUE INSENSITIVE HEADER ASSEMBLY

CROSS-REFERENCE TO RELATED APPLICATION

The present application is a National Stage of PCT/US2010/033601, filed 4 May 2010, now WIPO Publication No. WO 2010/129591, which was a Continuation of U.S. patent application Ser. No. 12/387,548, filed 4 May 2009, now U.S. Pat. No. 7,878,069, issued 1 Feb. 2011. Each of the above-listed applications is herein incorporated by reference as if fully set forth below in their entireties.

FIELD OF THE INVENTION

This invention relates to high pressure transducers and more particularly to an "H" shaped cross sectional transducer header which is relatively insensitive to mounting torque.

BACKGROUND OF THE INVENTION

The following applications are generally related to this application. See application entitled "HIGH PRESSURE TRANSDUCER HAVING AN H-SHAPED CROSS-SECTION" filed on Mar. 19, 2008 as Ser. No. 12/077,637 which is a continuation in part (CIP) of application Ser. No. 11/825,089 filed on Jul. 3, 2007 with the same title, both applications are assigned to Kulite Semiconductor Products, Inc., the assignee herein. If one refers to the above-noted co-pending applications cited under related applications, one will ascertain that there is disclosed high pressure transducers which basically have an "H" shaped cross section. As indicated in the co-pending applications, these devices can operate at pressures in excess of 60,000 psi. Thus as one can ascertain, the pressures are extremely high. The applications, as indicated above, disclose a transducer having an "H" shaped cross section. Essentially the diaphragm is thick in order to obtain high pressure operation. In any event, the above noted applications describe such a diaphragm which has a step or flange portion, which essentially surrounds the active a diaphragm area. Thus the active area is smaller than the active area of prior art devices. By including the step resulting in a smaller diameter active area, one can now obtain negative stresses at the edges of the diaphragm. This enables a full Wheatstone bridge configuration to be employed. As one can ascertain from the above noted applications, most high pressure sensing headers employ front faced sealing. Such techniques utilize a crush ring or a metal to metal seal. In any event, the force to make this seal is applied by installing a threaded element behind a header. The header and seal are then placed in compression. Based on experimental data, there is a high zero shift and a torque sensitivity when employing this installation technique. The finite element analysis indicates that the face sealing header is placed in compression, which in turn compresses or pinches the outer periphery of the thick sensing diaphragm in the "H" section. This pinch causes radial strain in the diaphragm and affects the linearity and zero shift of the pressure sensor. It is therefore an object of the present invention to provide a header assembly which is insensitive to installation torque. The header assembly, as will be described, is insensitive to the mounting torque and therefore enables high pressure sensing headers to be utilized in a reliable and efficient manner.

BRIEF SUMMARY OF THE INVENTION

According to some embodiments, a pressure transducer assembly includes a diaphragm member comprising an "H" shaped cross section with a central diaphragm area comprising two upper extending arms and two lower extending arms forming an "H" shaped cross section; and an outer cylindrical shell surrounding said "H" shaped diaphragm member, said outer cylindrical shell secured to said diaphragm member, said shell comprising a top surface with an aperture communicating with said central diaphragm area of said member, said shell positioned to at least partially enclose said diaphragm member and operating to absorb installation torque applied to said assembly during installation whereby said diaphragm member receives a relatively insignificant installation torque.

DETAILED DESCRIPTION OF THE INVENTION

Figure 1:
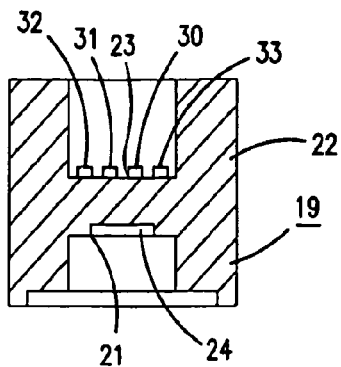
FIG. 1 is a cross sectional view of a prior art "H" shaped diaphragm which employs face sealing.

Referring to FIG. 1 there is shown a cross sectional view of a prior art "H" shaped transducer as the type utilized in the prior art. FIG. 1 essentially corresponds to FIG. 3 of the co-pending applications designated as Ser. No. 12/077,637 and 11/825,089. Thus, there is shown in FIG. 1 the "H" shaped transducer as indicated in the above noted applications. The transducer configuration 19 includes a step or flange portion 21 which essentially surrounds the active area or diaphragm area 24. Thus the active area 24 is smaller than the active area of prior art devices. By including the step 21 and the smaller diameter active area 24, one now obtains negative stresses at the edges of the diaphragm area 24. Thus the step section 21 enables negative stresses to be provided at the periphery of the diaphragm area 24. By measuring the strain, one can obtain an electrical output proportional to the high pressures experienced by the diaphragm. Thus as seen in FIG. 1, sensors which are piezoresistive gauges are positioned on the diaphragm 24 as sensors 30, 31, 32 and 33. The sensors are arranged into a full Wheatstone bridge which therefore increases the output and accuracy. Thus there are two gauges as 30 and 31 which are positioned about the center of the active area 24 and on the gauge side 23. Gauges 30 and 31 are both positive operating strain gauges. Overlying the step portion 21, which surrounds the active area 24, are gauges 32 and 33. These gauges are negative strain gauges. Thus gauges 30, 31, 32 and 33 are wired as a conventional Wheatstone bridge to enable one to obtain greater output as well as greater accuracy. The full Wheatstone bridge on the transducer responds to pressures up to 60,000 psi with a large and accurate output.

Figure 2:
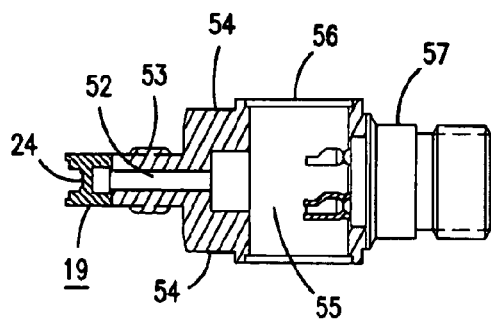
FIG. 2 is a cross sectional view of a prior art transducer utilizing the diaphragm of FIG. 1.

Referring to FIG. 2 there is shown a cross sectional view of a typical transducer utilizing the "H" shaped cross sectional unit of FIG. 1. Thus as seen in FIG. 2, the transducer configuration which is the "H" shaped transducer 19 is welded to the front end of a pressure sensor. The front end of the pressure sensor or pressure transducer has a passageway 52 which allows wires from the gauges on the section 19 to be directed. There is also a threaded portion 53 which mates with a sealing housing section 54. The housing section 54 is coupled to a body 56 or shell which has an internal hollow 55 where compensation/electronics are positioned. There is shown a connector 57 as well. Thus the device in depicted in FIG. 2 is mounted as follows: An aperture is provided into which a threaded section 53 is directed. The aperture is also threaded and the "H" section 19 is then inserted in the aperture while the device is placed in position by means of the thread 53. There would be a compression ring which would co-act with the front edge of the "H" section header and abuts against the bottom of the aperture to enable a tight seal to be formed between the face of the header 24 and the wall of the aperture. The crush ring or a metal to metal is provided when installing the threaded element 53 behind the sealing header 54. In this manner, a tight seal is provided to prevent leakage. The force required to mate the seal is supplied by installing the threaded element 53 behind the header section as 19. Thus the header and seal are placed in compression. Experimental data indicates a high zero shift in torque sensitivity which results from this installation technique. The analysis indicates that the face sealing header 19 is placed in compression which in turn compresses or pinches the outer periphery of the thick sensing diaphragm 24 in the "H" section 19. This pinch causes radial strain in the diaphragm 24 and affects the linearity and zero shift of the pressure sensor.

Figure 3:
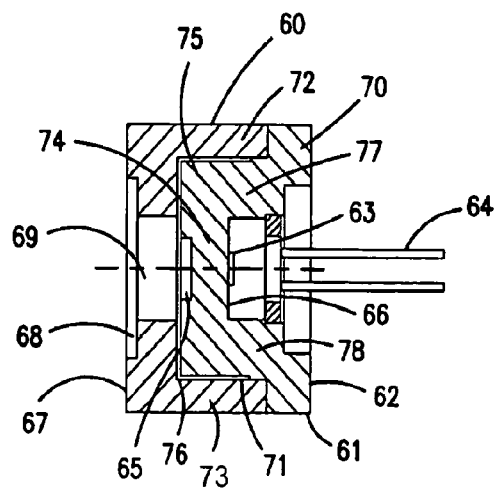
FIG. 3 is a cross sectional view of an improved torque insensitive header assembly according to some embodiments of the present invention.

Referring to FIG. 3 there is shown a cross sectional view of a "H" shaped header 61 and a torque isolating outer shell 60. As seen in FIG. 3, there is shown an isolation shell 60. The shell 60 essentially is of a "C" shaped cross section and has extending arms 72 and 73. The shell has a sealing surface 67, which surface will be pressed against the wall into which the header will be placed, as will be shown and explained. Essentially the shell contains an aperture 69 which allows media passage and contains a counterbore 68 which will accommodate a crush ring so that when the unit is placed on a surface or wall, a crush ring which is situated in aperture or depression 68 is forced against the wall in which the transducer is inserted and forms a tight metal seal. Essentially the media passage aperture 69 communicates with aperture 65 which is the top aperture in the "H" shaped header 61. The "H" shaped header has thick diaphragm 74, the underside of the diaphragm 66 has secured or fixed thereto strain gauges as 63, which strain gauges are conventionally formed in a Wheatstone bridge array. Essentially the header, which is "H" shaped, has top arms 75 and 76, which are shorter than the bottom extending arms 78 and 77. As one can see, the "H" shaped header has a peripheral flange 70 which encircles the top portion of the header. The peripheral flange 70 has a peripheral face 62 which will be welded to the main transducer body. Thus as can be seen from FIG. 3, the torque isolation shell 60 surrounds and encloses the "H" shaped header 61. The walls 73 and 72 of the isolation shell have their ends welded to the peripheral flange 70 associated with the "H" shaped header 61. As one can ascertain, there is a space 71 between the surfaces of the "H" shaped header and the top portion. In this manner, the torque isolation shell 60 encloses the pressure sensing "H" shaped diaphragm member 61 while isolating the section 71 from the installation stresses caused by the face sealing feature. As seen in FIG. 3, the outer shell 60 consists of a cylindrical wall which encloses the "H" section unit 61. The surface 67 of the shell 60 has a counterbore 68 which will enclose a crush ring. The outer shell 60 acts as a bypass element for the compressive load. The passage 69 through the center allows the sense media to reach the "H" section diaphragm 74. Thus as one can ascertain upon installation, only the crush ring, which is positioned in counterbore 68 and the outer shell 60 experiences compression. There is no installation load on the interior "H" section 61. Accordingly, the installation torque will compress the outer section 60 and the crush ring, and the crush ring forming the high pressure metal to metal seal. The interior "H" section 61 only experiences stress due to pressure which is directed to the diaphragm via the inlet 69. Thus, the unit which is the "H" shaped configuration 61 should not be affected by the installation torque.

Figure 4:
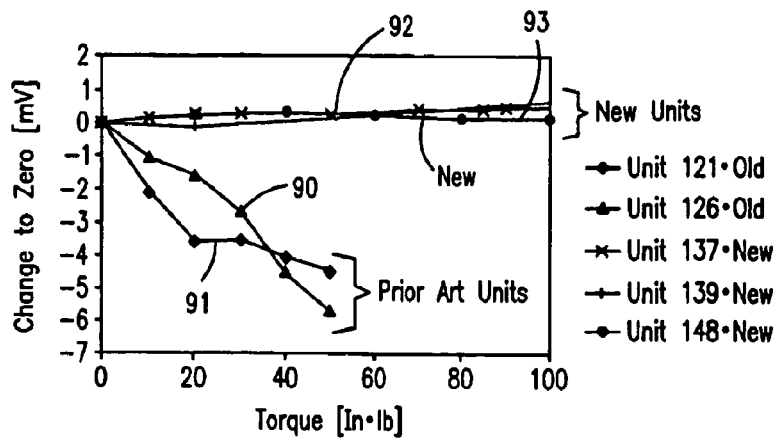
FIG. 4 is a graph depicting test data of the torque insensitive unit of FIG. 3 as compared to a torque sensitive unit.

Referring to FIG. 4 there is shown the torque versus the change in zero shift of the new units as depicted in FIG. 3 by curves 92 and 93 as compared to prior art units as shown as curves 90 and 91. The prior art units, being the unit depicted in FIG. 2. It is seen that the "H" shaped section shown in FIG. 3 also contains the step concentric flange or rim which essentially is depicted in the above noted co-pending applications and which step portions surrounds the active area of the diaphragm 74. The step of course functions as described in the prior art.

Figure 5:
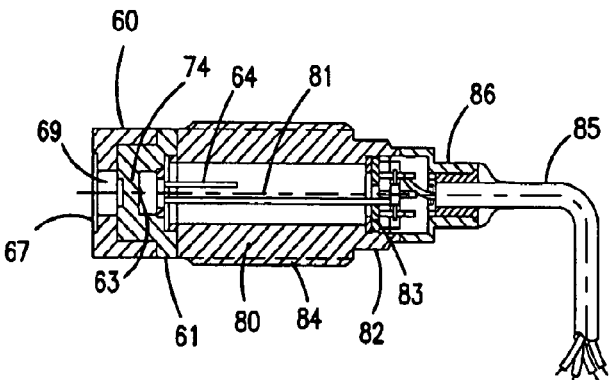
FIG. 5 is a cross sectional view of a transducer assembly which employs a torque isolation shell according to some embodiments of the present invention.

Referring to FIG. 5 there is shown the composite structure depicted in FIG. 3 consisting of the outer torque isolating shell 60 which is welded at its ends to the "H" section header portion 61. The ends of the "H" section header, such as surfaces 62 are welded to a main body 80, which has a threaded portion 84. The main body has a central aperture 81 which accommodates leads and also accommodates the extending pins 64. There is a hex shaped section 82, which hex shaped section enables placement with a wrench. Extending from section 82 is a hollowed area which contains the circuit board 83, which is contiguous with a cable release section 86 and cable 85. Thus the entire transducer, which contains the isolation shell 60 and the "H" shaped header 61 is secured to the body 80, which body 80 is threaded by means of a thread portion 84. In this manner, the hex portion 82 is accommodated by suitable wrench, where the entire transducer unit is now placed in a threaded aperture via the threads 84. The aperture communicates with a force transmitting media which essentially passes through the diaphragm 74 of the "H" section via passageway 69. The same reference numerals have been employed in FIG. 5 to designate corresponding parts as used in FIG. 3. Thus as shown, because of the isolation shell 60, the "H" shaped header 61 experiences no installation load and therefore will only experience stress due to pressure as directed through aperture 69 and not in any manner be affected by the installation torque. As seen in FIG. 4, zero shift is negligible in units which have the header configuration depicted in FIG. 3.

Figure 6:
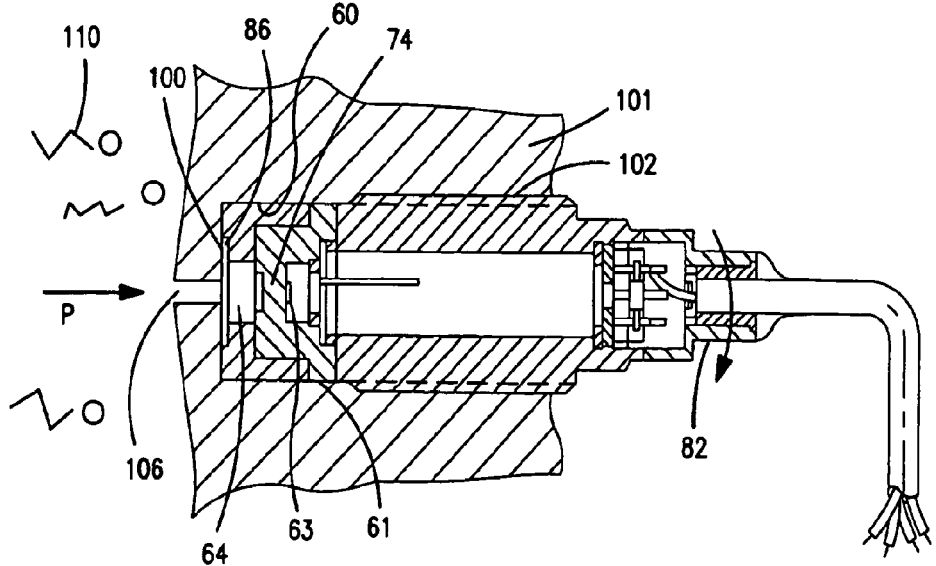
FIG. 6 is a cross sectional view showing the installation of a transducer fabricated according to some embodiments of the present invention.

Referring to FIG. 6 there is shown a typical installation. In FIG. 6, numeral 101 depicts a wall which may be, for example, the wall of a combustion engine. The wall has formed therein an aperture 102 which is threaded, and which also has an inlet aperture 106 to allow pressure to enter. The pressure environment 110 may be oil pressure or some other pressure. In any event, the entire transducer assembly as depicted in FIG. 5, is inserted into the aperture 102. It is inserted into the aperture 102 by the thread 84 co-acting with the thread of the aperture and by turning or exerting a torque on the installation hex portion 82 via a tool such as a wrench. As seen by the arrow, the entire unit is rotated by means of the hex wrench or other device so that it is screwed into the aperture 102. The counterbore 68 contains a crush ring 100. As the unit is turned and therefore proceeds to enter the aperture 102, the crush ring 100 is pushed against the inner face of the wall, thus allowing the passageway 106 to communicate with the passageway 69 in the transducer assembly. The torque isolation shell 60 bears the force imparted as the crush ring 100 is pushed against the wall associated with the aperture 106. Thus the majority of the torque is experienced by the shell 60 and there is virtually no torque transmitted to the "H" section header 61. As shown in FIG. 6, only the crush ring 100 and the outer shell 60 experience compression, thus there is no installation load on section 61. The shell 60 is separated from the header 61 by the space 71 and only the flange 70 experiences torque. The crush ring and the outer section form the high pressure metal to metal seal. The wall 101 is conventionally a metal wall and the entire body of the transducer including the isolation shell, the header and so on are also fabricated from metal. Thus there is described a torque insensitive header assembly which may be utilized in conjunction with high pressure measurements using "H" shaped devices having relatively thick diaphragms.

In certain implementations, the compression experienced by the outer shell 60 of the device shown in FIG. 3 can affect the area near the weld to the "H" section header 61 and can affect the active diaphragm stress. In the design of the torque insensitive header assembly of FIG. 3, the diaphragm 74 is forward of the weld, and the header 61 is not fully enclosed by the cylindrical wall of the outer shell 60. As a result, in certain very high pressure situations (e.g., greater than about 30,000 psi, and, more specifically, those that approach 100,000 psi), which require high installation torques (e.g., greater than or equal to about 350 inch-pounds), there may be some torque sensitivity. To address such potential sensitivity in these very high pressure situations, these two design features (i.e., the diaphragm's relationship to the weld and the extent to which the header is enclosed by the cylindrical wall of the outer shell) can be modified to produce a header assembly with even less torque sensitivity. An example of such a modified header assembly is shown in FIG. 7.

Figure 7:
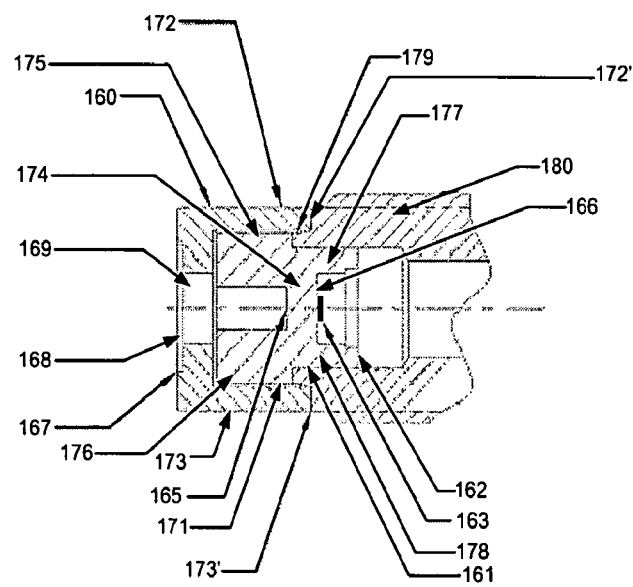
FIG. 7 is a cross sectional view of an improved torque insensitive header assembly according to some embodiments of the present invention.

Referring to FIG. 7, there is shown a cross sectional view of a "H" shaped header 161 and a torque isolating outer shell 160. Similar to the design shown in FIG. 3, the outer shell 160 has essentially a "C" shaped cross section with extending arms 172 and 173. The top 172' and 173' of these extending arms 172 and 173, form a cylinder, which, unlike the design shown in FIG. 3, directly contacts the main transducer body 180. The shell 160 has a sealing surface 167, which will be pressed against the wall into which the header assembly will be placed. The shell 160 contains an aperture 169, which allows media passage, and a counterbore 168 that will accommodate a crush ring to facilitate a better seal as described above for the assembly of FIG. 3. The media passage aperture 169 communicates with aperture 165, which is the top aperture in the "H" shaped header 161. The "H" shaped header 161 has a thick diaphragm 174, the underside 166 of which has secured or fixed thereto strain gauges 163, which are conventionally formed in a Wheatstone bridge array. The diaphragm 174 in this design is significantly raised within the isolating outer shell 160 such that the top aperture 165 is larger. This serves to increase the stiffness of the sides of the "H" shaped header 161 and decrease any effects of stress transmitted through the cylindrical ring formed by the extending arms 172 and 173 of the isolation shell 160. The "H" shaped header 161 has top arms 175 and 176, which can be shorter, the same length as, or longer than the bottom extending arms 178 and 177. In this design, the "H" shaped header 161 does not have a peripheral flange because the toque isolation shell 160 directly contacts the main transducer body 180. Thus, in contrast to the header assembly shown in FIG. 3 where the torque isolation shell 60 surrounds and encloses all but the peripheral flange 70 of the "H" shaped header 61, the torque isolation shell 160 of FIG. 7 completely surrounds and encloses the "H" shaped header 161. In contrast to the assembly shown in FIG. 3, the extending arms or walls 173 and 172 of the isolation shell 160 in this design have a portion of an inner side 179 welded to a surface of the main transducer body 180. Thus, the header 161 is entirely enclosed inside of the cylindrical ring formed by the extending arms 172 and 173 of the isolation shell 160. In this manner, any transmission of stress during compression of the walls of the cylindrical ring formed by the extending arms 172 and 173, to the header, will be eliminated. In this design, there still remains a space 171 between the surfaces of the "H" shaped header 161 and the top portion of the isolation shell 160.

Figure 8:
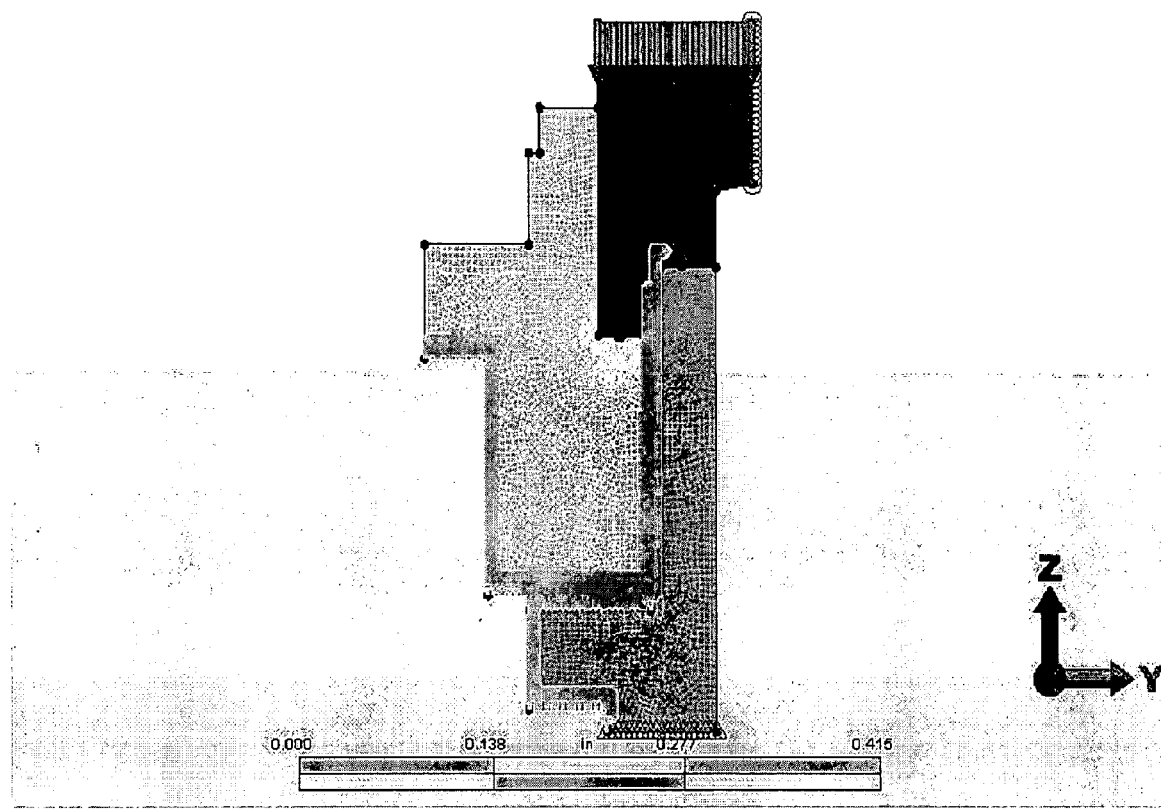
FIG. 8 is a base finite element analysis (FEA) model showing the header assembly of FIG. 7.
Figure 9:
FIG. 9 illustrates the results of a FEA calculation showing locations and amounts of stress based on application of torque only to the header assembly of FIG. 7.
Figure 10:
FIG. 10 illustrates the results of a FEA calculation showing locations and amounts of stress based on application of torque and pressure to the header assembly of FIG. 7.

Referring to FIGS. 8-10 there are shown various finite element analysis (FEA) models of the header assembly shown in FIG. 7 under different conditions. Specifically, FIG. 8 illustrates the base FEA model used for the header assembly of FIG. 7. FIGS. 9 and 10 map the results of the calculations showing locations and amounts of stress based on application of torque only and both torque and pressure, respectively, to the header assembly of FIG. 7. These calculations were based on an installation torque of 350 inch-pounds and a pressure of 75,000 psi. Based on these figures, the date indicate that the torque sensitivity of such an assembly will be about 1.4%.

Figure 11:
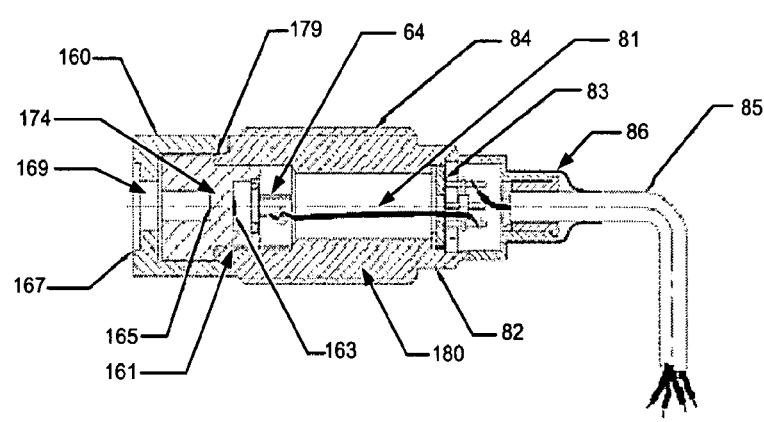
FIG. 11 is a cross sectional view showing the installation of a transducer fabricated according to some embodiments of the present invention.

Finally, FIG. 11, like FIG. 5, illustrates a composite transducer structure. This structure implements the header assembly of FIG. 7 and the main body portion of FIG. 5. The improved high pressure features of the header assembly of FIG. 7 can be imparted to the overall transducer structure of FIG. 11. The same reference numerals have been employed in FIG. 11 to designate corresponding parts as used in FIGS. 7 and 11.

It should be apparent to one skilled in the art that there are many alternative embodiments which may be discerned from the Figures and descriptions given above and all of which are deemed to be encompassed within the spirit and the scope of the claims appended hereto.

What is claimed is:

1. A pressure transducer assembly, comprising:
    a header comprising a central diaphragm area, two upper extending arms, and two lower extending arms;
    an outer cylindrical shell substantially surrounding the two upper extending arms of said header, said shell comprising a top surface defining a first aperture that is in communication with said central diaphragm area, said shell operative to absorb installation torque applied to said assembly during installation while isolating said central diaphragm area from said installation torque; and
    a main transducer body substantially surrounding the two lower extending arms of said header.

2. The pressure transducer assembly according to claim 1, wherein said central diaphragm area further comprises at least one strain gage positioned thereon.

3. The pressure transducer assembly according to claim 1, wherein said first aperture on said top surface of said cylindrical shell further comprises a counterbore surrounding the same.

4. The pressure transducer assembly according to claim 3, further comprises a crush ring positioned in said counterbore.

5. The pressure transducer assembly according to claim 1, wherein said header and said cylindrical shell are fabricated from a metal.

6. The pressure transducer assembly according to claim 1, wherein said header is secured to a threaded housing section comprising an internal hollow with the bottom extending arms of the header secured to said housing section and with said central diaphragm area communicating with said hollow of said housing.

7. The pressure transducer assembly according to claim 6, wherein said housing section comprises an installation section operative to rotate said housing so that threaded section can be inserted into a threaded aperture.

8. The pressure transducer assembly according to claim 1, further comprising a sensor array positioned on said central diaphragm area.

9. The pressure transducer assembly according to claim 8, wherein said array is a Wheatstone bridge.

10. The pressure transducer assembly according to claim 1, wherein said two upper extending arms are of the same height, which height is less than said two lower extending arms.

11. The pressure transducer assembly according to claim 1, wherein the outer shell directly contacts the main transducer body.

12. The pressure transducer assembly according to claim 1, wherein the header defines a second aperture adapted to increase stiffness in the upper and lower extending arms of the header and further isolate the header from high installation torques.

13. The pressure transducer assembly according to claim 12, wherein the second aperture facilitates the communication between the first aperture and the central diaphragm area.

14. A pressure transducer assembly, comprising:
a header comprising a first and second top arm, a first and second bottom arm, and a diaphragm;
a torque isolating outer shell comprising first and second extending arms, and a first aperture in communication with the diaphragm;
the first and second top arms of the header being completely or almost completely surrounded by the first and second extending arms of the torque isolating outer shell;
the first and second bottom arms of the header being at least partially surrounded by the first and second extending arms of the torque isolating outer shell and at least partially surrounded by a main transducer body; and
wherein the first and second extending arms of the torque isolating outer shell directly contact the main transducer body.

15. The pressure transducer assembly of claim 14, wherein the header defines a second aperture adapted to increase stiffness in at least the first and second top arms of the header and decrease effects of stress transmitted by the first and second extending arms of the torque isolating outer shell.

16. The pressure transducer assembly of claim 15, wherein the second aperture facilitates the communication between the first aperture and the diaphragm.

17. The pressure transducer assembly of claim 14, wherein the diaphragm comprises at least one strain gage positioned thereon.

18. The pressure transducer assembly of claim 14, wherein the first aperture comprises a counterbore surrounding the same.

19. The pressure transducer assembly of claim 18, further comprising a crush ring positioned in said counterbore.

20. The pressure transducer assembly of claim 14, further comprising a sensor array positioned on the diaphragm.

21. The pressure transducer assembly of claim 20, wherein the array is a Wheatstone bridge.

* * * * *